United States Patent

[11] 3,619,507

[72] Inventor Philip B. Metz
Saratoga, Calif.
[21] Appl. No. 852,314
[22] Filed Aug. 22, 1969
[45] Patented Nov. 9, 1971
[73] Assignee International Business Machines Corporation
Armonk, N.Y.

[54] TRANSMIT ONLY ACOUSTIC COUPLER
4 Claims, 3 Drawing Figs.

[52] U.S. Cl. .................................................... 179/1 C, 179/2 C
[51] Int. Cl. .................................................... H04m 11/06
[50] Field of Search ........................................ 179/1 C, 2 C, 5 P, 178, 179, 100 L, 1 HF

[56] References Cited

UNITED STATES PATENTS

| | | | |
|---|---|---|---|
| 3,180,937 | 4/1965 | Moser | 179/1 |
| 3,277,243 | 10/1966 | Fairbairn | 179/81 |
| 3,299,207 | 1/1967 | Cooke | 179/1 |
| 3,301,955 | 1/1967 | Clements | 179/1 |

*Primary Examiner*—Kathleen H. Claffy
*Assistant Examiner*—Horst F. Brauner
*Attorneys*—Hanifin and Jancin and Shelley M. Beckstrand

ABSTRACT: A transmit only acoustic coupler for semipermanent attachment to the microphone cover of a telephone handset, permitting selective transmission of live voice or recorded voice and/or tone encoded data, includes a hearing aid type of dynamic speaker with no back venting, and a valve arrangement adjustable between open and pneumatically sealed positions.

INVENTOR.
PHILIP B. METZ

BY Shelley M Beckstrand
ATTORNEY

TRANSMIT ONLY ACOUSTIC COUPLER

BACKGROUND OF THE INVENTION

1. Field of the Invention

This invention relates to an acoustic coupler for transmission of recorded voice and/or tone encoded data over voice grade telephone lines.

2. Description of the Prior Art

A number of methods have been employed for the transmission of computer data from a terminal to a central processor for the purpose of credit authorization, data collection, inventory control, etc. For example, this data transmission may be accomplished via leased line. However, in such applications as credit authorization, it may be desired to transmit from a plurality of locations and utilize the regular switched network. This may be accomplished by attaching a terminal directly to the telephone lines via an AT&T Data Access Arrangement. However, this requires the installation of the Data Access Arrangement with its attendant delay and expense. Another approach, suffering from similar problems of delay and expense, is to provide a hard wire connection to the telephone microphone output line from the terminal tone generating circuitry.

It would be much more desirable to be able to acoustically couple tone encoded data from a terminal device directly to the microphone of the telephone handset. Prior devices for acoustically coupling to the handset of a telephone have been generally bulky, such that the handset may not be cradled normally on the telephone base with the acoustic coupler attached. Furthermore, the acoustic couplers of the prior art are relatively sensitive to environmental noise which results in unreliable data transmission. This poor exclusion of ambient noise results from designs which do not provide adequate pneumatic sealing of the coupler to the microphone cover as well as from the incorporation of apertures or vents for relieving speaker back pressure.

In many commercial applications it is also desired to be able to transmit both computer data and/or recorded voice from a terminal to a central processor as well as to permit the use of the telephone for normal voice conversation. Generally, the prior art devices require the removal of the acoustical coupler before the phone may be used for live voice transmission, or require an electrical wire connection involving a rework or alteration of the handset microphone, as noted above.

SUMMARY OF THE INVENTION

It is, therefore, an object of this invention to provide an acoustic coupler which may be semipermanently attached to a telephone handset microphone cover which will permit the selective transmission of recorded voice and/or computer data and of voice conversation.

It is a further object of the invention to provide an acoustic coupler which may remain attached to the handset cover while said handset is cradled on the telephone base.

It is a further object of the invention to provide an acoustic coupler which, while permitting in one mode the transmission of live voice, in a second mode provides for the transmission of recorded voice and/or computer data with exclusion of environmental noise.

The invention provides an acoustic coupler for semipermanent attachment to a telephone handset microphone cover which permits the selection of either live voice or recorded voice and/or tone encoded data transmission over a switched telephone network. An enclosure cover is pneumatically sealed to the handset microphone cover. Contained within said enclosure or having access to said enclosure is a dynamic speaker for transmission of recorded voice and/or tone encoded computer data. Within said enclosure cover is a valve, said valve being adjustable between a pneumatically sealed position for data transmission and an open position for live voice transmission.

BRIEF DESCRIPTION OF THE DRAWINGS

The foregoing and other objects, features and advantages of the invention will be apparent from the following more particular description of preferred embodiments of the invention as illustrated in the accompanying drawings.

In the drawings.

DESCRIPTION OF THE PREFERRED EMBODIMENTS

Figures 1, 2:
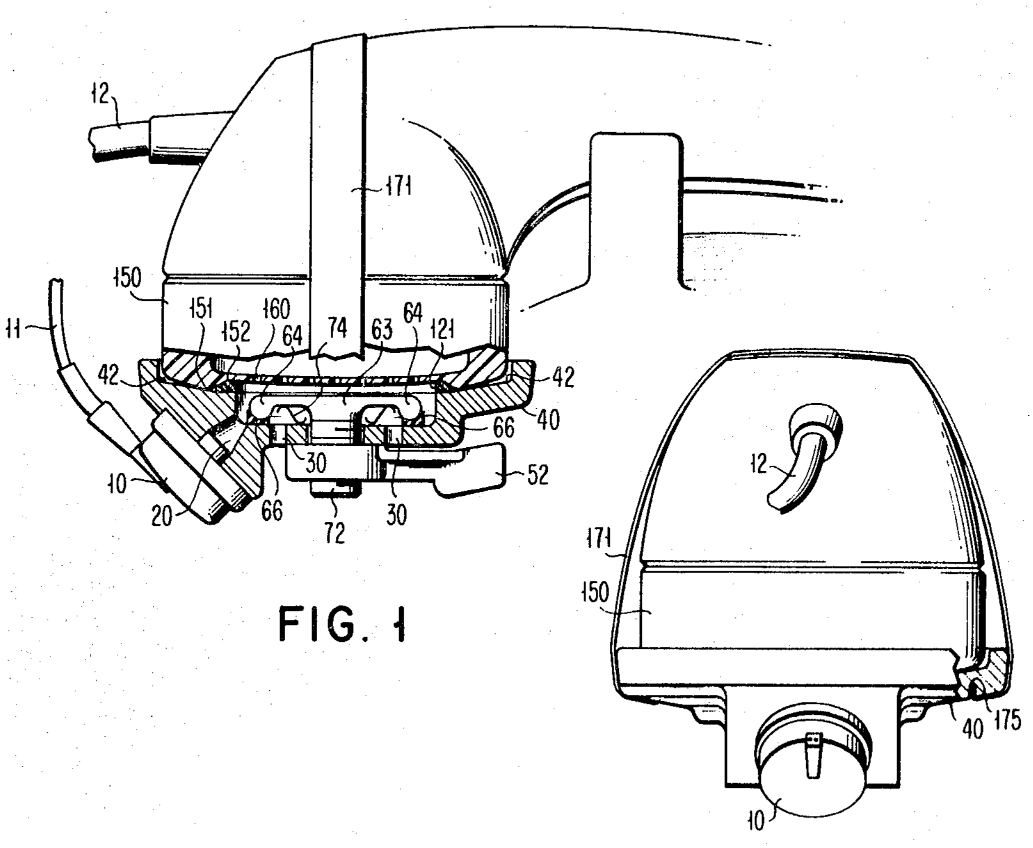
FIG. 1 is a cutaway view of a preferred embodiment of the acoustic coupler of the invention.
FIG. 2 is another view of a preferred embodiment of the invention showing a manner in which the acoustic coupler of FIG. 1 may be attached to the telephone handset.

Referring now to the drawings, a detailed description will be given of the acoustic coupler of the invention. The dimensions of the acoustic coupler in both embodiments are such that the handset may be cradled on the telephone base without removal of the acoustic coupler, and thus the acoustic coupler may be said to be designed for semipermanent attachment to the handset microphone cover.

The acoustic coupler of the invention permits, in the voice transmission mode, normal use of the telephone. In the recorded voice and/or data transmission mode, ambient noise is excluded from the handset microphone and the sound generated by dynamic speaker 10 is transmitted over the telephone lines 12.

Referring to FIG. 1, the enclosure cover 40, which is pneumatically sealed to the handset microphone cover 150 for excluding ambient noise, will be described. Acoustic coupler enclosure cover 40 is mounted to handset microphone cover 150 such that an annular line contact is maintained between surface 42 of acoustic coupler base 40 and the raised perimeter 151 of the handset microphone cover 150. In this position, gasket 121 is compressed between surface 42 of enclosure cover 40 and annular depression 152 of the handset microphone cover 150. While, in this embodiment, there may be some solid conduction of ambient noise across said line contact between surface 42 and raised perimeter 151, as will be apparent to those skilled in the art, the annular gasket 121 may be extended to separate the enclosure cover 40 from microphone cover 150 along the line 151, to enhance the noise exclusion characteristics of the seal. However, the particular seal arrangement shown in FIG. 1 limits the compression of gasket 152 when cover 40 is attached to handset cover 150, assuring that the elastic limit of gasket 152 will not be exceeded, permitting extended use of said gasket 152 without serious deterioration of its acoustical properties.

Dynamic speaker 10 is permanently mounted to the acoustic coupler enclosure cover 40 over the outside opening of data transmission port 20, permitting sound generated by said speaker 10 to pass into the handset microphone through perforations 160.

The valve means for permitting recorded voice and data transmission or live voice transmission will next be described. Voice transmission ports 30 are also provided in the enclosure cover 40 as shown. Annular baffle 63 has an extended threaded portion 72 which is keyed into cover 40 such that said baffle 63 will not rotate about its longitudinal axis. Threaded on to the portion 72 of baffle 63 is handle 52. By tightening handle 52, the baffle 63 is lowered as in FIG. 1 into the sealed position shown. Spring washer 74 is mounted on baffle 63 between said baffle and the enclosure 40 such that upon loosening handle 52, baffle 63 will be raised into the open position (not shown). A plurality of voice transmission ports 30 are arranged on a circumference which is smaller than the circumference 64 of said annular baffle 63, such that all of said ports 30 are circumscribed by the baffle 63. Thus, the baffle 63 and ports 30 together with handle 52 comprise a valve arrangement for determining whether the acoustical coupler is in the live voice or data transmission modes.

In the voice transmission mode, the valve handle 52 is rotated such that there is an air space clearance between annular baffle 64 and annular gasket 66 which is mounted on surface 43 of the base 40. In this mode, the operator may use the telephone handset in the normal manner, with the voice sound waves passing through voice transmission ports 30, around baffle 64, and through perforations 160 to the handset microphone.

To place the acoustic coupler in the data transmission mode, the operator rotates valve handle 52 in such a manner that threaded portions 72 is drawn down as shown in FIG. 1 until the circumferential portion 64 of annular baffle 63 compresses annular gasket 66 to effect a pneumatic seal about voice ports 30 for excluding ambient external noise from the handset microphone.

Referring now to FIG. 2, the clamping means for sealing enclosure cover 40 to handset 150 will next be described. Herein, spring clip 171 is bent to fit around the handset cover 150 and engage slots 175 in enclosure cover 40 with the force necessary to compress gasket 152 sufficiently to permit a secure line contact between enclosure cover 40 and handset cover 150 at raised circumference portion 151.

Figure 3:
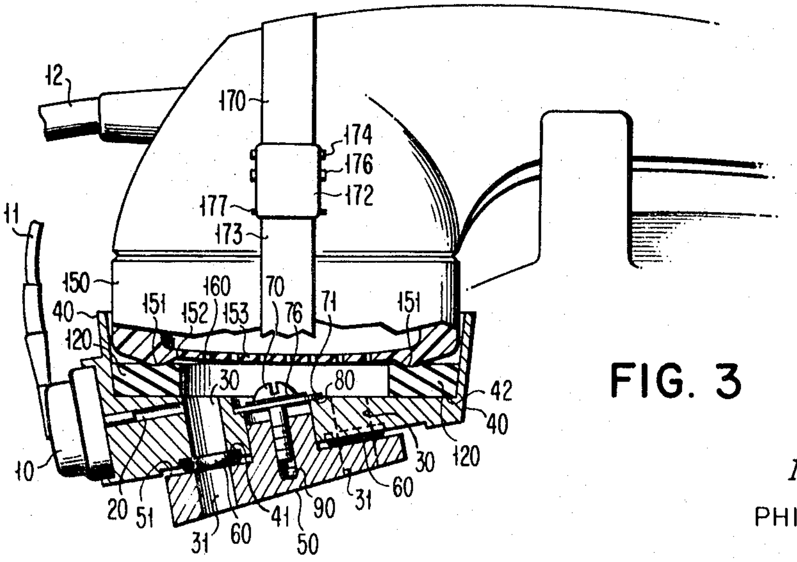
FIG. 3 is a cutaway view of a second embodiment of the invention.

Referring now to FIG. 3, the second embodiment of the acoustic coupler of the invention will be described, starting with the clamping and gasket means for pneumatically sealing enclosure cover 40 to handset cover 150. Straps 170 and 173 are connected to enclosure cover 40 similar to the manner shown in FIG. 2 with respect to the spring clip 171. The strap 170 is further attached to lock toggle 172 at pin 174, and strap 173 is attached to pin 176. The pins 174 and 176 are connected through a linkage which pivots on pin 177, with pins 174 and 177 connected by the portion of toggle 172 visible in FIG. 3, and pins 176 and 177 connected by a linkage member not shown. When toggle 172 is open, pins 174 and 176 separate, loosening the straps 170 and 173 for installing or removing the acoustic coupler. When toggle 172 is closed, straps 170 and 173 tighten, compressing gasket 120 between handset cover 150 and enclosure cover 40 to effect a pneumatic seal.

The gasket seal 120 is preferably of a dense elastic material such as neoprene or butyl rubber. The spring action of clamp 171 in FIG. 2 or the action of toggle 172 of FIG. 3 may be used effectively with either the acoustic coupler of FIG. 1 or FIG. 3.

Hearing aid type dynamic speaker 10 is attached to the terminal by cable 11. Said dynamic speaker 10 is permanently attached to the enclosure cover 40 over the outside opening of data transmission port 20, which allows sound waves generated in dynamic speaker 10 to pass through perforations 160 in the handset microphone cover 150 for transmission of tone encoded data, recorded voice, etc.

Mounted to enclosure cover 40 is rotor 50. Screw 70 in tapped hole 90 is tightened until the force between washer 71 and bearing 80 is sufficient to compress O-rings 60 between the surface 41 of stator 40 and surface 51 of rotor 50. Preferably, three O-rings 60 are mounted in three recesses 41 of stator body 40 to provide a three point contact to maintain a parallel relationship between planes 41 of stator 40 and 51 of rotor 50. Lockwasher 76 prevents rotation of screw 70 within rotor 50. A stator voice transmission port 30 is located within each recess 41. When in the live voice transmission mode, rotor voice transmission ports 31 are aligned with the stator voice transmission ports 30. Rotor 50 is rotated about the axis of screw 70 to place the acoustic coupler in the data transmission mode. In this mode, rotor voice transmission ports 31 are not aligned with stator voice transmission ports 30 and the O-rings 60 seal said ports 31 from said ports 30 such that ambient noise is excluded from the inner chamber of the acoustic coupler.

The rotor 50 is further rotated to align rotor voice transmission port 31 with stator voice transmission port 30 to place the acoustic coupler back in the voice transmission mode.

While not shown, a pin may be mounted in rotor 50 to cooperate with a groove in stator 40 to define the limits of travel between the data transmission mode and the voice transmission mode and to permit more accurate alignment of ports 30 and 31.

The dimensions of the acoustic coupler are such that the handset may be cradled in its base without the removal of the acoustic coupler. Further, the acoustic coupler may be cradled in either the voice or the data transmission modes.

With the speaker 10 having a 600-ohm impedance, corresponding to telephone line impedance, two alternative means of coupling to the telephone line without electrical modification of the external electrical equipment is assured. These alternate means are the utilization of the acoustic coupler of the invention, and the use of the AT&T Data Access Arrangement.

While the invention has been particularly shown and described with reference to preferred embodiments thereof, it will be understood by those skilled in the art that the foregoing and other changes in form and details may be made therein without departing from the scope and spirit of the invention.

What is claimed is:

1. An acoustic coupler for semipermanent attachment to a telephone handset microphone cover for permitting either live voice or recorded voice and tone-encoded data transmission over a voice grade switched telephone network, comprising:
   - enclosure cover means pneumatically sealed to the handset microphone cover for excluding ambient noise in the data transmission mode,
   - a dynamic speaker pneumatically sealed to said enclosure cover without back venting to the external environment and having air port access to said microphone,
   - valve means contained within said enclosure cover, said valve being adjustable between a pneumatically sealed position for permitting recorded voice and data transmission and an open position for permitting live voice transmission,
   - whereby ambient noise is excluded from the handset microphone during data and recorded voice transmission.

2. An acoustic coupler for semipermanent attachment to a telephone handset microphone cover for transmitting recorded voice and tone encoded data over voice grade switched telephone networks, comprising:
   - an enclosure cover having a data transmission port and a plurality of voice transmission ports,
   - a dynamic speaker pneumatically sealed to said enclosure cover over the outside opening of said data transmission port, without back venting to the outside environment,
   - clamping means and gasket means for pneumatically sealing said enclosure cover to said telephone handset,
   - annular gasket means mounted on said cover and circumscribing said voice ports,
   - annular baffle means cooperating with said annular gasket means for pneumatically sealing said voice ports when in the data transmission mode, and
   - handle means for releasing said baffle means to open said voice ports when in the live voice transmission mode.

3. An acoustic coupler for semipermanent attachment to a telephone handset microphone cover for transmitting recorded voice and tone encoded data over voice grade switched telephone networks, comprising:
   - an enclosure cover having a data transmission port and a live voice transmission port means,
   - a dynamic speaker pneumatically sealed to said enclosure cover over the outside opening of said data transmission port, without back venting to the outside environment,
   - clamping means and gasket means for pneumatically sealing said enclosure cover to said handset cover,
   - rotor means rotatably mounted on said enclosure cover over said voice port means and having second live voice transmission port means, said second port means being aligned with said voice port means when in the live voice transmission mode, and
   - second gasket means for pneumatically sealing said voice port means when said rotor is rotated into the data transmission mode.

4. The acoustic coupler of claim 3 characterized in that said second gasket means comprises three O-ring seals whereby in the data transmission mode the clamping force between said rotor and said enclosure cover is evenly distributed to enhance the pneumatic sealing of said voice port means.

* * * * *